(12) United States Patent
Gutta et al.

(10) Patent No.: US 7,113,074 B2
(45) Date of Patent: Sep. 26, 2006

(54) METHOD AND SYSTEM FOR AUTOMATICALLY CONTROLLING A PERSONALIZED NETWORKED ENVIRONMENT

(75) Inventors: Srinivas Gutta, Buchanan, NY (US); Miroslav Trajkovic, Ossining, NY (US); Antonio J. Colmenarez, Peekskill, NY (US)

(73) Assignee: Koninklijke Philips Electronics N.V., Eindhoven (NL)

( * ) Notice: Subject to any disclaimer, the term of this patent is extended or adjusted under 35 U.S.C. 154(b) by 1377 days.

(21) Appl. No.: 09/822,452

(22) Filed: Mar. 30, 2001

(65) Prior Publication Data

US 2006/0072791 A1    Apr. 6, 2006

(51) Int. Cl.
- G05B 19/00 (2006.01)
- G06F 7/00 (2006.01)
- G06K 9/00 (2006.01)
- G06T 1/00 (2006.01)
- H04B 1/00 (2006.01)

(52) U.S. Cl. ............... 340/5.53; 340/5.1; 340/5.24
(58) Field of Classification Search ......... 340/5.53, 340/5.52, 5.54, 5.1, 5.2, 5.82, 5.83, 5.7, 545; 382/115–119, 124; 48/25, 31
See application file for complete search history.

(56) References Cited

U.S. PATENT DOCUMENTS

| | | | |
|---|---|---|---|
| 4,449,189 A | 5/1984 | Feix et al. | 364/513.5 |
| 5,541,585 A * | 7/1996 | Duhame et al. | 340/5.62 |
| 6,023,224 A * | 2/2000 | Meyvis | 340/545.1 |
| 6,108,437 A | 8/2000 | Lin | 382/118 |
| 6,111,517 A * | 8/2000 | Atick et al. | 340/5.83 |
| 6,119,096 A * | 9/2000 | Mann et al. | 705/5 |
| 6,496,595 B1 * | 12/2002 | Puchek et al. | 382/124 |

FOREIGN PATENT DOCUMENTS

| | | |
|---|---|---|
| DE | 19858310 A | 6/2000 |
| DE | 10024895 A | 11/2001 |
| EP | 0808048 A2 | 11/1997 |
| EP | 0910215 A2 | 4/1999 |
| GB | 2285365 A | 7/1995 |
| IT | 1244929 | 2/1991 |
| RU | 2123721 | 12/1998 |
| WO | WO9830017 | 7/1998 |
| WO | 0051096 A | 8/2000 |

* cited by examiner

Primary Examiner—Wendy R. Garber
Assistant Examiner—Nam Nguyen

(57) ABSTRACT

Using known methods of face recognition, appliances can be automatically initiated and/or adjusted as a user enters an environment, such as a home or a room. The environment is networked such that there is a communication link between a camera monitoring the entrance to the environment, a face recognition system, and the appliances. The method of automatically controlling a networked environment includes capturing a face image of an individual, storing the face image (i.e., in a memory), and associating at least one appliance setup to the face image. The method also includes comparing the face image to stored face images, retrieving the at least one appliance setup for a matched face image, and initiating the at least one appliance setup. An appliance setup controls turning on or off an appliance, such as an illumination source, a television, or a stereo.

12 Claims, 4 Drawing Sheets

METHOD AND SYSTEM FOR AUTOMATICALLY CONTROLLING A PERSONALIZED NETWORKED ENVIRONMENT

FIELD OF THE INVENTION

The invention relates to a method and system for using face recognition to initiate networked appliances associated with an individual when they enter an environment.

BACKGROUND OF THE INVENTION

Current environments, such as homes, contain many appliances ranging from illumination sources (i.e., lamps) and climate control systems (i.e., air conditioners and heating systems) to entertainment devices (i.e., stereo, television) and message delivery systems (i.e., voicemail, fax, email). When an individual enters an environment, they must affirmatively perform an action to initiate each appliance and adjust each appliance to suit their tastes or deliver their personalized information. For example, to check one's voicemail, a user must dial up their voicemail carrier, enter their mailbox and pin number (for location and identification purposes) and perform a series of keystrokes to finally obtain their messages. Additionally, a user must sort through various messages that may be directed to other individuals before finding and receiving their own, such as with a telephone answering machine.

Face recognition identification technology, as described in U.S. Pat. Nos. 6,111,517 and 6,108,437, herein incorporated by reference, has been employed to identify individuals and restrict access to controlled environments. Present face recognition methods used in person identification systems, typically employ a face recognizer which determines the identity of a human face image. In order to identify the image, the system compares the face to other faces, or performs a feature extraction and compares features to those recorded in a database.

SUMMARY OF THE INVENTION

According to the invention, appliances can be automatically initiated and/or adjusted as a user enters an environment, such as a home or a room. The environment is networked such that there is a communication link between a camera monitoring the entrance to the environment, a face recognition system, and the appliances.

According to one aspect of the invention, a method of automatically controlling a networked environment includes a setup step and an initiating step. The setup step includes capturing a face image of an individual, storing the face image (i.e., in a memory), and associating at least one appliance setup to the face image.

The initiating step includes comparing the face image to stored face images, retrieving the at least one appliance setup for a matched face image, and initiating the at least one appliance setup. An appliance setup controls turning on or off an appliance, such as an illumination source, a television, or a stereo. Not only can the appliance be turned on or off, but the user can enter a quantifiable term associated with the appliance such as a level, a temperature, a volume, or a channel, to which the appliance will be set upon initiation.

According to an embodiment of the invention, when several users frequent the same environment over a course of time, the method prioritizes each user on a hierarchy of control to determine which user's setting to initiate. The prioritization includes associating a matched face image with a hierarchy of control over the at least one appliance setup. This is accomplished by first determining if a second individual previously initiated the at least one appliance setup, and if so, determining the hierarchy of control over the at least one appliance setup associated with the second individual. The method further includes initiating the at least one appliance setup associated with the matched face image only if no second individual previously initiated the at least one appliance setup, or if the matched face image ranks higher within the hierarchy of control. If users have the same rank, or neither one has a rank, a default setting could select between them or an average setting may be initiated (i.e., an average of the light levels each user selected).

According to another embodiment a password can be entered by the individual which, is verified as matching a preset password before storing the facial representation of the individual.

According to several embodiments of the invention, the at least one appliance setup includes a message storage device which receives and records incoming messages, determines if a message is associated with the individual, and recalls and recites the message associated with the individual upon the initiation step. The messages can be, but are not limited to, telephonic messages recorded on an answering machine or voicemail, email messages, facsimile messages, video clips, text-embossed images, or some combination thereof.

According to a second aspect of the invention, a system for automatically controlling a personalized networked environment upon an individual entering an environment includes a face recognition system for storing a face image of the individual, and determining the identity of the individual upon their entering the environment. The system also includes a memory for storing the face image and at least one appliance setup, at least one appliance setup capable of being initiated by the system, and a network connecting the appliance setup to the system.

DETAILED DESCRIPTION OF THE PRIMARY EMBODIMENT

Figure 1:
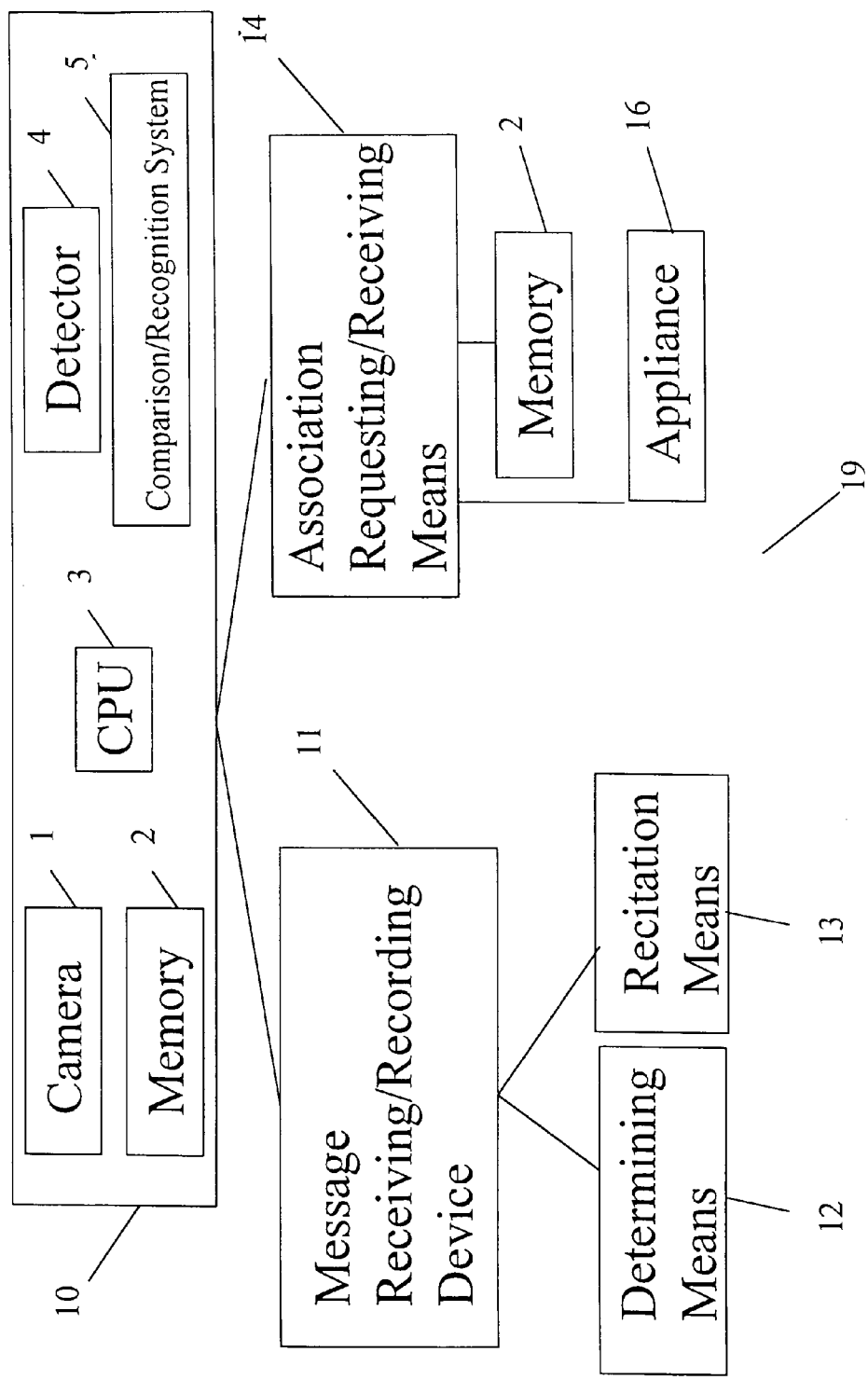
FIG. 1 is a block diagram of the networked system of the invention.

Referring to FIG. 1, networked system 19 uses face recognition to initiate networked appliances associated with an individual when they enter an environment. Initially, face recognition system 10 performs a registration of a user's face prior to the user leaving their house. Detector 4 detects the presence of a user and camera 1 captures their face and stores it in memory 2 using video face capture techniques well known in the art. The user may be required to enter an access code or some form of authorization before being permitted to register. The user also enters networked appliances he or she wishes to be initiated upon their return into CPU 3. Memory 2 stores these face captures and networked appliances.

Upon returning to their house, detector 4 detects the presence of a person by, for example, checking every 5 seconds for changes in the environment, or checking when a door to the environment is opened. Comparison/recognition system 5 compares the user's face to those stored in memory 2 and, when a match is found, recognizes the user according to face recognition methods known in the art. Once the user is recognized, determining means 12 determines if any recorded messages correspond to the user. The user is told if and how many messages they have and any messages that correspond to the user are then recited by recitation means 13. Networked system 19 also initiates appliance 16 after acquisition requesting/receiving means 14 recalls from memory 2 the appliance 16 with which the user requested to be associated.

Figure 2:
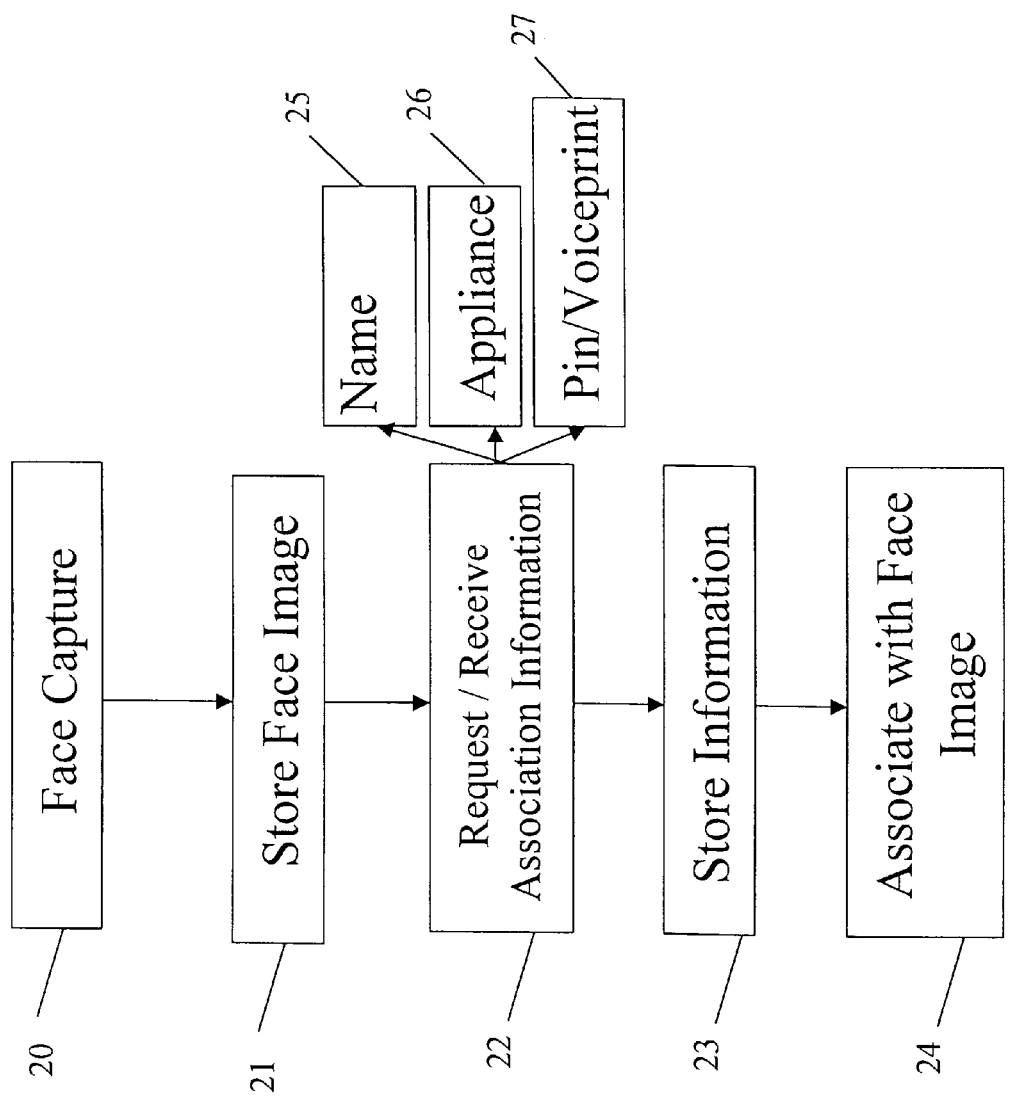
FIG. 2 is a flow chart depicting the storage steps of the method which occur prior to entering the environment.

FIG. 2 depicts the method steps of the system of FIG. 1 prior to a user leaving their house. Face recognition system 10 performs face capture step 20 via camera 1. Memory 2 stores the face capture according to storage techniques known in the art in step 21. In step 22, CPU 13 requests that the user input association information. For example, in steps 25–27 CPU 13 requests that the user input their name, an appliance with which they wish to be associated, and a personal identification number (pin) and/or voiceprint by which they can access the memory. The examples listed in steps 25–27 represent a non-exhaustive list of the association information the method can request. For purposes of this example, the user enters "Joe Smith" for their name, a light source and an air conditioner as appliances, and a pin of "1234". The user enters the information by, for example, typing on a keyboard or speaking into a voice recognition device. The system can also be configured to perform association automatically, for instance, by making a telephone answering machine associated with the user. Memory 2 saves the association information in step 23, and CPU 13 associates the association information with the stored face capture image in step 24. With respect to step 26, CPU 13 may also request a user to input a quantitative term associated with the appliance, such as a brightness setting for the light source, or a temperature associated to a heating source.

Figure 3:
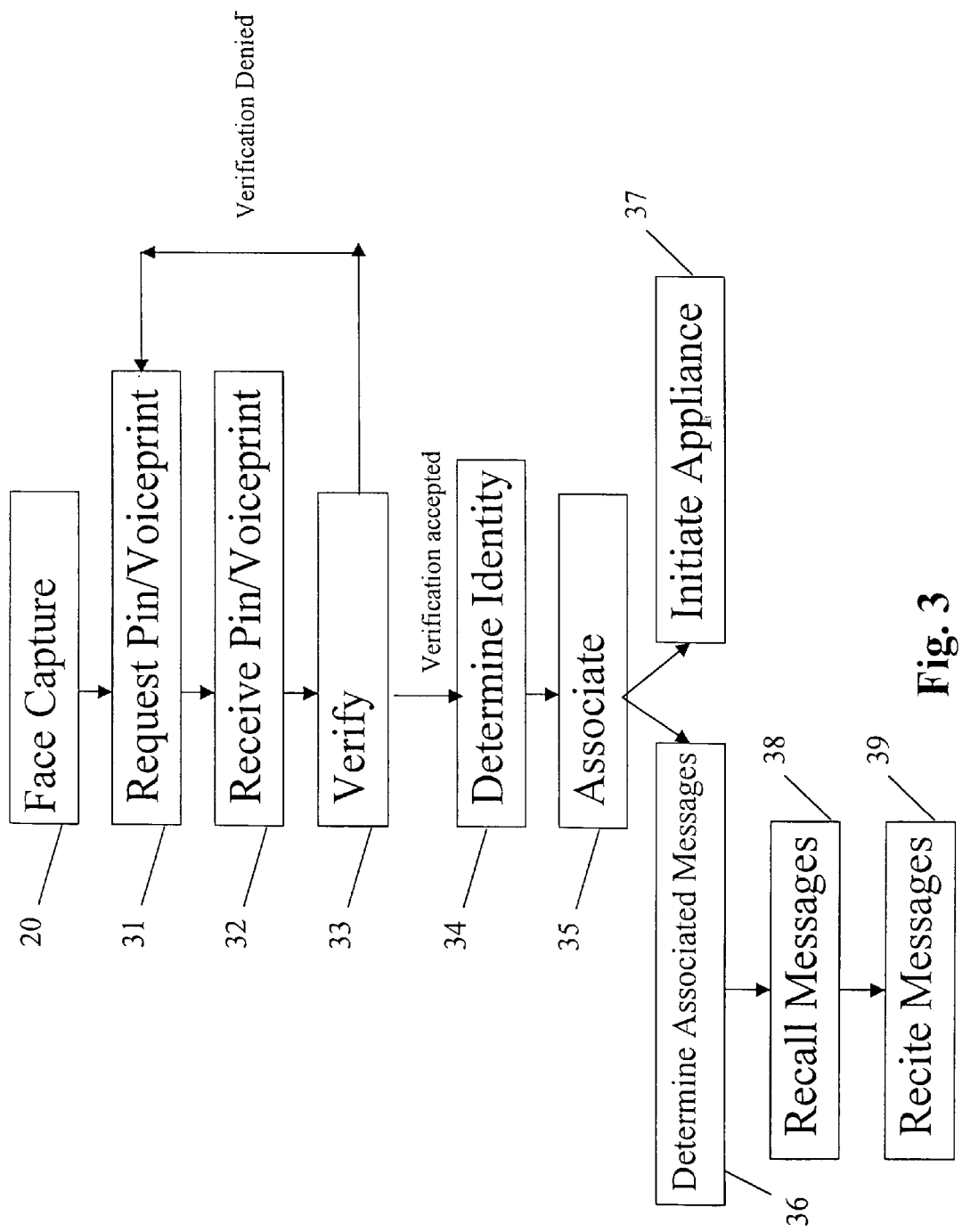
FIG. 3 is a flow chart depicting the steps of the method which occur upon a user entering the environment.

Once the steps of FIG. 2 are completed a user can then leave their house and upon their return, the steps listed in FIG. 3 will occur.

Referring to FIG. 3, upon entry through the doorway to their house, detector 4 detects their presence and camera 1 captures the user's face, as in step 20 of FIG. 1. Comparison/recognition system 5 compares the face capture with all previous stored captures, or performs a feature extraction which compares features of the user's face to those recorded in a database. Comparison/recognition system 5 determines the user's identity in step 34. CPU 3 recalls inputted association information stored in memory 2 in step 35 and may address the user through speech means (i.e., reciting "Welcome home, Joe Smith"). In a particular embodiment of the invention, determining means 12 determines which messages are associated with the user in step 36. If message recording device 11 is an answering machine this determination can occur, for example, by selecting those messages which include the user's name (previously entered or recorded in step 12). If the message recording device is, for example, a voicemail system, the user's personal voicemail box can be accessed. Message receiving/recording device 11 recalls any messages associated with the user in step 38 and recitation means 13 automatically recites those messages to the user in step 39. Recitation means 11 may also recite the number of messages determining means 12 determined in step 36 to be associated with the user.

Either simultaneously or nearly simultaneously to steps 36 and 38–39, CPU 3 initiates the light source and air conditioner which the user entered in step 22. Further, if the user entered a quantified term to which they wished the appliance set (i.e., the brightness of the light, or the temperature of the air conditioner), CPU 3 initiates the appliance to that amount in step 37.

Another possible embodiment of the invention provides that after the face capture in step 20, CPU 3 requests that the user provides their pin number in step 31. The user enters their pin number, CPU 3 receives it in step 32, and verifies that the pin number "1234" matches the user's face capture in step 33. If the pin number or voiceprint does not match or is not verified, CPU 3 repeats the request for input of a pin number. If no verification occurs after several attempts, the method may perform an additional face capture, or simply maintain its current settings.

Figure 4:
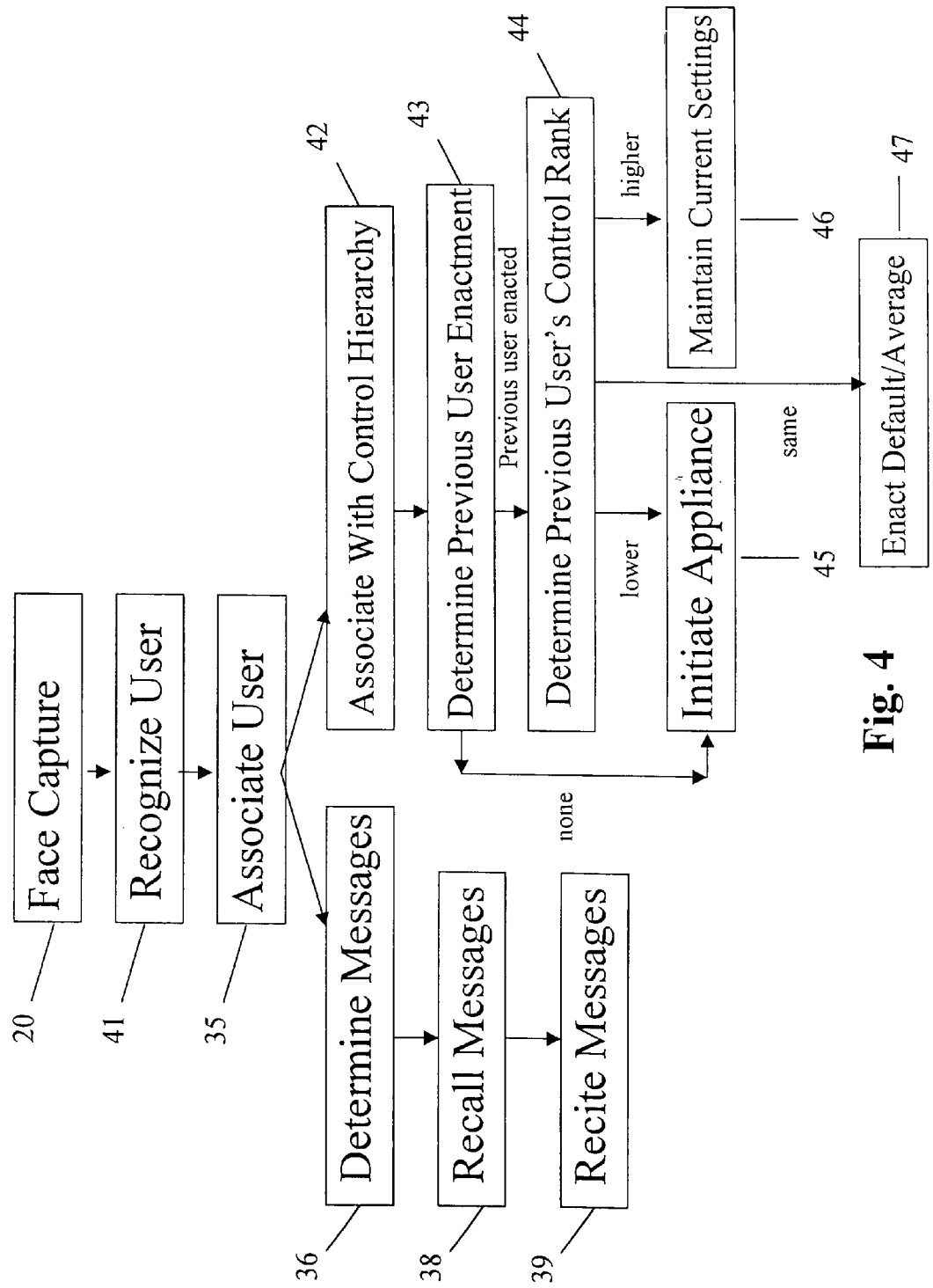
FIG. 4 is a flow chart depicting the steps of the method which occur when more than one user occupies the same environment.

Control problems may arise when a user enters the house and a second user with second control settings is already in the house. To remedy such situations FIG. 4 depicts the steps 41–46. After the user enters the house, camera step 10 captures their face and comparison/recognition system 5 performs a recognition at step 41. CPU 3 associates the user with the light source and air conditioner in step 35. CPU 3 also associates the user with a control hierarchy in step 42, whereby the user is ranked for each appliance selected with regard to whose preference, of all registered users, controls. CPU 3 determines if a second user has previously initiated the light source and/or the air conditioner and if that user is still present in step 43. If no second user is detected, CPU 3 initiates the light source and air conditioner according to the user's preference in step 45. If, however, a second user is detected and is present, CPU 3 determines the previous user's control rank with respect to the user's in step 44. If the second user has a lower rank, CPU 3 initiates the light source and air condition according to the user's preference in step 45. If the second user has a higher rank, CPU 3 instead maintains the current settings of the appliance(s) in step 46. If both the first and second users have the same rank, CPU 3 initiates a default setting or an average setting in step 47.

The preceding expressions and examples are exemplary and are not intended to limit the scope of the claims that follow.

What is claimed is:

1. A method of automatically controlling a networked environment comprising:
   a setup step comprising:
   capturing a face image of an individual,
   storing the face image,
   associating at least one appliance setup to the face image,
   and an initiating step comprising:
   comparing the face image to stored face images,
   retrieving the at least one appliance setup for a matched face image, and
   initiating the at least one appliance setup, wherein the initiating step further comprises:
   associating the matched face image with a hierarchy of control over the at least one appliance setup,
   determining if a second individual previously initiated the at least one appliance setup,
   determining the hierarchy of control over the at least one appliance setup associated with the second individual, and
   initiating the at least one appliance setup associated with the matched face image only if either no second individual previously initiated the at least one appliance setup, if the matched face image ranks higher within the hierarchy of control, or based on a default or average setting if the matched face image and the second individual have the same rank.

2. The method of claim 1, wherein a face recognition system performs the capturing and comparing steps.

3. The method of claim 1, wherein the at least one appliance setup further comprises a quantifiable term associated with at least one networked appliance.

4. The method of claim 3, wherein the quantifiable term comprises a level, a temperature, a volume, a channel, a track of a recording, a period of time, a frequency, or period of time.

5. The method of claim 1, wherein the setup step is performed upon request of the individual.

6. The method of claim 1, wherein the initiating step is performed automatically.

7. The method of claim 1, wherein the associating step further comprises inputting the at least one appliance setup into a memory by typing on a keyboard, by speaking into a voice recognition system, or by selecting the at least one personal feature trots a touch-sensitive screen.

8. The method of claim 1, wherein the at least one appliance setup controls at least one illumination source, a television, a stereo, a device for playing recorded music, a microcomputer, a device for preparing food, or an interior climate control device.

9. The method of claim 1, wherein the associating step further comprises selecting a specific feature of the at least one appliance setup and the initiating step initiates the at least one appliance setup according to the specific feature.

10. The method of claim 1, wherein the at least one appliance setup comprises a message storage device and the initiating step further comprises
   receiving an incoming message into a device for receiving messages,
   recording said message onto a recording medium
   determining if the message is associated with the face image
   recalling the message associated with the face image, and
   reciting the message associated with the face image through a recitation means.

11. The method of claim 10, wherein the receiving, recording, recalling, and reciting steps comprise:
   telephonic message receiving, recording, recalling, and reciting and the recording medium records telephonic messages,
   email message receiving, recording, recalling, and reciting and the recording medium is a device for storing email,
   facsimile message receiving, recording, recalling, and reciting and the recording medium records facsimile messages, or some combination thereof.

12. The method of claim 1, wherein the method further comprises requesting a password be entered by the individual, receiving said password, and verifying that the password matches a preset password before storing the facial representation of the individual.

* * * * *